United States Patent
Malhan et al.

(10) Patent No.: US 11,094,192 B2
(45) Date of Patent: Aug. 17, 2021

(54) METHOD AND SYSTEM FOR GENERATING AND PROCESSING SAFETY MESSAGES FOR VEHICLE-TO-EVERYTHING COMMUNICATION

(71) Applicant: DENSO International America, Inc., Southfield, MI (US)

(72) Inventors: Rajesh Kumar Malhan, Troy, MI (US); Joseph Lull, South Haven, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 0 days.

(21) Appl. No.: 16/837,887

(22) Filed: Apr. 1, 2020

(65) Prior Publication Data
US 2020/0394910 A1 Dec. 17, 2020

Related U.S. Application Data

(60) Provisional application No. 62/859,986, filed on Jun. 11, 2019.

(51) Int. Cl.
| | | |
|---|---|---|
| G08G 1/09 | (2006.01) | |
| G08G 1/0967 | (2006.01) | |
| G08G 1/16 | (2006.01) | |
| G08G 1/01 | (2006.01) | |
| H04W 4/40 | (2018.01) | |

(52) U.S. Cl.
CPC ..... *G08G 1/096783* (2013.01); *G08G 1/0116* (2013.01); *G08G 1/16* (2013.01); *H04W 4/40* (2018.02)

(58) Field of Classification Search
CPC .. G08G 1/096783; G08G 1/16; G08G 1/0116; H04W 4/40

USPC .......................................................... 340/905
See application file for complete search history.

(56) References Cited

U.S. PATENT DOCUMENTS

| | | |
|---|---|---|
| 7,861,275 B1 | 12/2010 | Vellaikal et al. |
| 9,421,909 B2 | 8/2016 | Strickland et al. |
| 9,460,625 B2 | 10/2016 | Wells |
| 9,646,496 B1 | 5/2017 | Miller |

(Continued)

FOREIGN PATENT DOCUMENTS

| | | |
|---|---|---|
| CN | 109672996 | 4/2019 |
| EP | 2242024 | 2/2015 |
| KR | 100687712 | 2/2007 |

OTHER PUBLICATIONS

Danyang Tian, Weixia Li, Guoyuan Wu, Kanok Boriboonsomsin, Matthew Barth, Samer Rajab, Sue Bai, Evaluating the Effectiveness of V2V-based Lane Speed Monitoring Application: A Simulation story, 2016 IEEE 19th International conference on intelligent transportation system (Year: 2016).*

*Primary Examiner* — Tanmay K Shah
(74) *Attorney, Agent, or Firm* — Burris Law, PLLC

(57) ABSTRACT

An infrastructure edge device is configured to generate and broadcast a proxy safety message regarding a moving object. A method for a subject vehicle to process the proxy safety message includes determining whether data provided in the proxy safety message is valid based on sensor data from one or more sensors disposed about the subject vehicle, content of the proxy safety message, or a combination thereof. The method further discards the proxy safety message in response to the proxy safety message including invalid data.

17 Claims, 4 Drawing Sheets

(56) References Cited

U.S. PATENT DOCUMENTS

| | | |
|---|---|---|
| 2015/0287323 A1 | 10/2015 | Wells |
| 2015/0381751 A1 | 12/2015 | Haran |
| 2017/0214747 A1 | 7/2017 | Schulte et al. |
| 2017/0288886 A1 | 10/2017 | Atarius et al. |
| 2017/0323490 A1 | 11/2017 | Tijink et al. |
| 2018/0018888 A1 | 1/2018 | Townsend |
| 2018/0167790 A1 | 6/2018 | Cavalcanti et al. |
| 2019/0053154 A1* | 2/2019 | Song ................ H04W 52/0216 |
| 2019/0096243 A1 | 3/2019 | Doig et al. |
| 2019/0297499 A1* | 9/2019 | Hawkes ................ H04W 12/40 |

* cited by examiner

METHOD AND SYSTEM FOR GENERATING AND PROCESSING SAFETY MESSAGES FOR VEHICLE-TO-EVERYTHING COMMUNICATION

CROSS-REFERENCE TO RELATED APPLICATIONS

This application claims priority to and the benefit of U.S. Provisional Application No. 62/859,986 filed on Jun. 11, 2019. The disclosure of the above application is incorporated herein by reference.

FIELD

The present disclosure relates to a method and system for communicating messages between a roadside device and a vehicle.

BACKGROUND

The statements in this section merely provide background information related to the present disclosure and may not constitute prior art.

Technological advancements have been made in the area of vehicle-to-everything communication (V2X) in which vehicles, roadside devices, mobile computing devices, cloud-based network, and cellular phones, among other components, form distributed computing systems for sharing and processing data. As an example, a vehicle may transmit a basic safety message (BSM) that includes dynamic characteristics of the vehicle such as the location (e.g., current and previous), speed, and/or travel direction of the vehicle.

An infrastructure control device can receive BSMs from vehicles and a personal safety message (PSM) from a mobile computing device of a vulnerable road user (VRU) such as a pedestrian, and in some applications, re-broadcast the messages or other messages/warnings based on the information in the BSMs and PSMs. The accuracy of the information provided in BSMs and PSMs can be difficult to validate since different vehicle manufacturers use different technologies for determining or estimating its dynamic characteristics. In addition, while advancements have been made, V2X communication and more particularly, vehicle-to-vehicle communication has not been fully realized and thus, a vehicle having a V2X system may not be receiving BSMs and/or PSM for other vehicles and/or VRUs.

SUMMARY

This section provides a general summary of the disclosure and is not a comprehensive disclosure of its full scope or all of its features.

In one form, the present disclosure is directed toward a method for generating a message including dynamic characteristics of a moving object. The method includes acquiring data from a roadside sensor, identifying a moving object within a detection area based on the acquired data from the roadside sensor, calculating one or more dynamic characteristics of the moving object based on the acquired data from the roadside sensor, generating a proxy safety message for the identified moving object, and broadcasting the proxy safety message for the identified moving object. The proxy safety message includes data indicative of the calculated dynamic characteristics of the identified moving object.

In one form, the present disclosure is directed towards a method for processing a proxy safety message from an infrastructure edge device in communication with a subject vehicle. The method includes receiving a proxy safety message regarding a moving object external of the subject vehicle. The proxy safety message includes data indicative of dynamic characteristics of the moving object. The method further includes determining whether the data of the proxy safety message is valid based on sensor data from one or more sensors disposed about the subject vehicle, content of the proxy safety message, or a combination thereof and discarding the proxy safety message in response to the proxy safety message being invalid.

In one form, the present disclosure is directed towards a system for a subject vehicle. The system includes a processor and a non-transitory computer-readable medium comprising instructions that are executable by the processor. The instructions includes: authenticating a sender of a proxy safety message, where the proxy safety message includes data indicative of dynamic characteristics of a moving object, determining whether the data of the proxy safety message is valid based on sensor data from one or more sensors disposed about the subject vehicle, content of the proxy safety message, or a combination thereof and discarding the proxy safety message in response to the proxy safety message being from an authorized sender or including invalid data.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
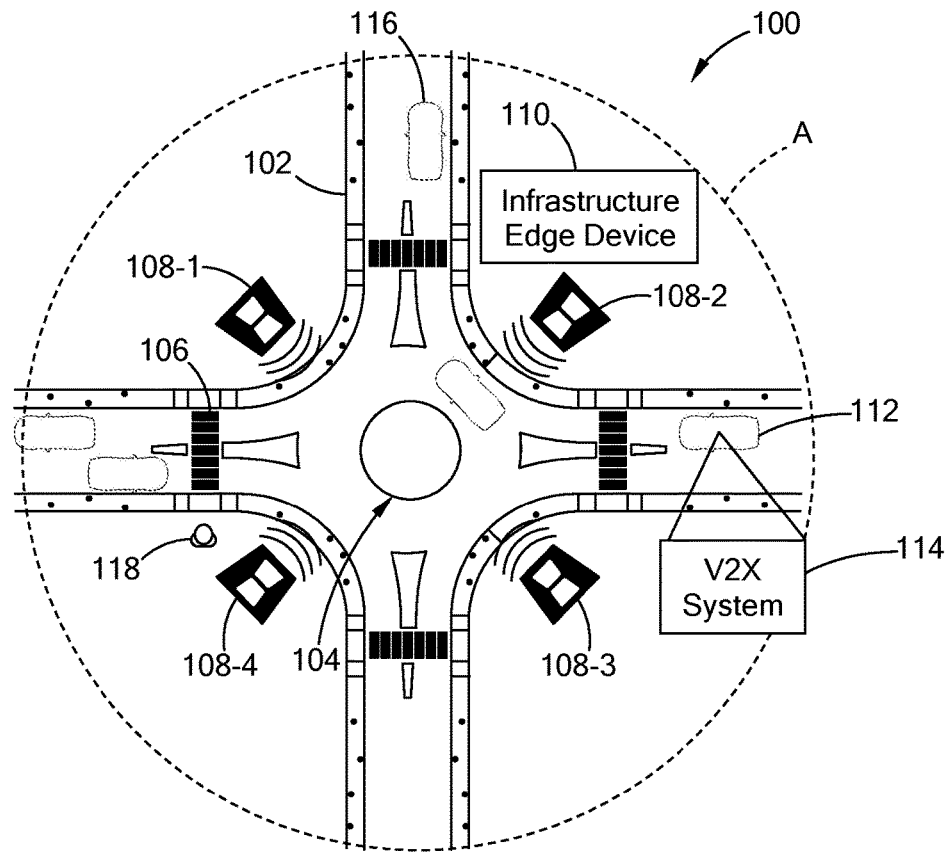
FIG. 1 illustrates a roadway having an infrastructure system and a vehicle in communication with the infrastructure system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, an infrastructure system 100 broadcasts proxy safety messages regarding a moving object detected within a detection area of the infrastructure system 100 to devices in communication with the infrastructure system 100. The infrastructure system 100 is provided along a roadway 102 that is an intersection having a roundabout 104 and pedestrian walkways 106. The infrastructure system 100 includes multiple roadside sensors 108 (108-1 to 108-4 in FIG. 1) and an infrastructure edge device (IED) 110 (i.e., an infrastructure computing device) in communication with the roadside sensors 108. It should be readily understood that the infrastructure system 100 may be provided for other types of roadways such as highways, four-way stops, intersections with traffic lights, among other, and should not be limited to the configuration illustrated.

In one form, the infrastructure system 100 is configured to provide device-to-device communication which incorporates vehicle-to-infrastructure communication and infrastructure-to-pedestrian (i.e., vulnerable road user (VRU)) communication, by way of a communication network that may encompass dedicated short-range communication (DSRC), cellular communication (e.g., 3GPP and 5G), and/or satellite communication. Accordingly, the infrastructure system 100 may include gateways, routers, base stations, edge or distributed computing, and intermediary communication devices, among other components to support one or more communication networks.

In one form, one or more vehicles 112 having a V2X system 114 travel through the infrastructure system 100 and communicate with the IED 110, and may be referred to as a connected vehicle (CV) 112. The infrastructure system 100 may also be traveled by one or more vehicles 116 that do not have a V2X system and thus, do not in communicate with the IED 110 and/or other vehicles. These vehicles 116 may be referred to as non-connected vehicle (NCV) 116. The vehicles 112 and 116 may include fully autonomous vehicles, partial-autonomous vehicles, and/or non-autonomous vehicles.

With the V2X system 114, the CV 112 generates and broadcasts a basic safety message (BSM) that provides dynamic characteristics of the CV 112. Specifically, the BSM includes specific dynamic characteristics (i.e., vehicle data) regarding the CV 112 such as, but not limited to, vehicle size, position, speed, travel direction, acceleration, steering wheel angle, positional accuracy, and/or brake system status. In one form, specific data entries of the BSM may be considered mandatory such as a timestamp, position, and/or travel direction. Various protocols may be used for generating a BSM such as, but not limited to, Society of Automotive Engineers (SAE) J2735.

In addition to vehicles 112 and 116, the IED 110 may communicate with a vulnerable road user by way of a mobile computing devices such as a smart phone and/or a tablet that is in possession of the VRU. In one form, a connected mobile computing device may be referred to as a connected vulnerable road user (CVRU), which is illustrated in FIG. 1 with reference number 118. In one form, the CVRU 118 may broadcast a personal safety message (PSM) that includes data indicative of dynamic characteristics of the vulnerable road user such as position, travel direction, among other information. Various protocols may be used for implementing a PSM such as SAE J2735 or J2945/9 protocols which are based on DSRC communication. However, other protocols and/or communication networks may be used. In the following, CV 112 and CVRU 118 may collectively referred to as "connected devices," herein. In addition, PSM and BSM may collectively be referenced as "safety messages."

The roadside sensors 108 of the infrastructure system 100 are arranged about the roundabout 104 to detect a moving object within a detection area that is generally identified as area A. In one form, the roadside sensors 108 may include, but are not limited to, cameras, radar, light detection and ranging sensor (LIDAR), infrared sensors, and/or ultrasonic sensors. While four roadside sensors 108 are illustrated, the infrastructure system 100 may include one or more roadside sensors.

In one form, the IED 110 is an edge computing device configured to perform the operations described herein including detecting a moving object based on data from the roadside sensors 108 and broadcasting a proxy message (PM) regarding the moving object. The proxy message may include and generally refer to a proxy BSM that provides data related to a vehicle (e.g., CV or NCV) and/or a proxy PSM that provides data related to a VRU that may or may not be in communication with the IED 110. The proxy message may also be referred to as a proxy safety message. Accordingly, the CV 112 may obtain dynamic characteristics regarding a moving object that is not in communication with CV 112.

Figure 2:
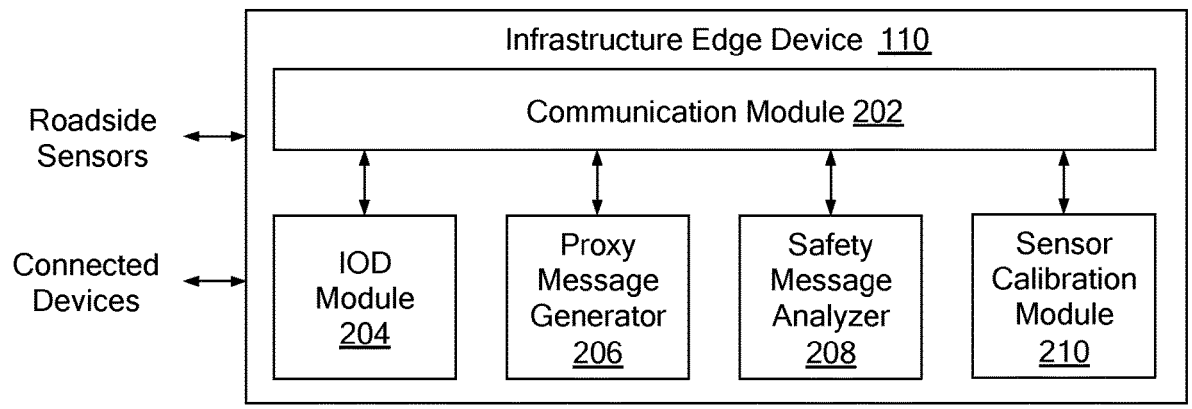
FIG. 2 is a block diagram of an infrastructure edge device of the infrastructure system in accordance with the teachings of the present disclosure.

Referring to FIG. 2, in one form, the IED 110 is configured to include a communication module 202, an infrastructure object detection (IOD) module 204, a proxy message generator 206, a safety message analyzer 208, and a sensor calibration module 210. The IED 110 includes a processor circuit, a memory circuit for storing computer readable instructions executed by the processor circuit, and other suitable hardware components to provide the described functionality of the modules 202, 204, 206, 208, and 210.

The communication module 202 is configured to communicate with the roadside sensors 108 to obtain data from the roadside sensors 108 by way of, for example, short-range wireless communication link such as Bluetooth™, Wi-Fi™, among others, and/or wired communication. The communication module 202 is also configured to communicate with the connected devices to exchange safety messages by way of DSRC and/or cellular communication. Accordingly, the communication module 202 may include one or more transceivers, radio circuits, amplifiers, modulation circuits, among others for communicating with various devices. The communication module 202 may be referenced as the infrastructure communication module 202 to distinguish from other communication modules described herein.

The IOD module 204 is configured to detect a moving object within the detection area A and determine one or more dynamic characteristics of the moving object based on data from the roadside sensors 108. For example, the roadside sensors 108 may emit a signal having predefined properties (e.g., frequency, waveform, amplitude, etc.), and receive a signal that is reflected off an object, such as an adjacent vehicle. Using known methods, the IOD module 204 analyzes the signals transmitted and received to determine whether a moving object is present, and if so, determines one or more dynamic characteristics based on one or more sensor data sets from the roadside sensors 108.

The proxy message generator 206 is configured to generate a PM for the moving object detected using BSM/PSM protocols described above. In one form, the PM includes data indicative of the dynamic characteristics of the moving object and supplemental information such as timestamp, device identification, among other information. The proxy message generator 206 may also use a predefined cryptographic protocol to provide secure transmission of the PM. For example, the cryptographic protocol may be a public-key cryptography protocol such as one defined in the security credential management system (SCMS) proof of concept (POC) message security encryption and certificate management.

The safety message analyzer 208 is configured to analyze the safety message received from a connected device. In one form, the safety message analyzer 208 authenticates the safety message using the predefine cryptographic protocol and determines if a received safety message is from a moving object detected by the IOD module 204. More particularly, in one form, the safety message analyzer 208 is configured to compare the dynamic characteristics provided in the safety message for a subject connected vehicle with calculated dynamic characteristics of a detected moving object. In one form, if the same, the communication module 202 does not broadcast the PM for the connected device.

In one form, if the detected moving object is the subject connected device, the sensor calibration module 210 is configured to calibrate the roadside sensors 108 using the data provided in the safety message for the subject connected device. Specifically, the dynamic characteristics of the subject connected device can be used as ground truth data to calibrate roadside sensors 108 and/or modify algorithms used by the IOD module 204 for detecting a moving object and calculating dynamic characteristics.

Once broadcasted, a connected device, such as the CV 112, is configured to process the PM to authenticate the source of the PM and validate the date provided in the PM. In one form, the CV 112 includes the V2X system 114 to broadcast and receive safety messages and other vehicular components to monitor dynamic characteristics of the CV 112, detect objects around the CV 112, or communicate with passengers within the CV 112, among other operations.

Figure 3:
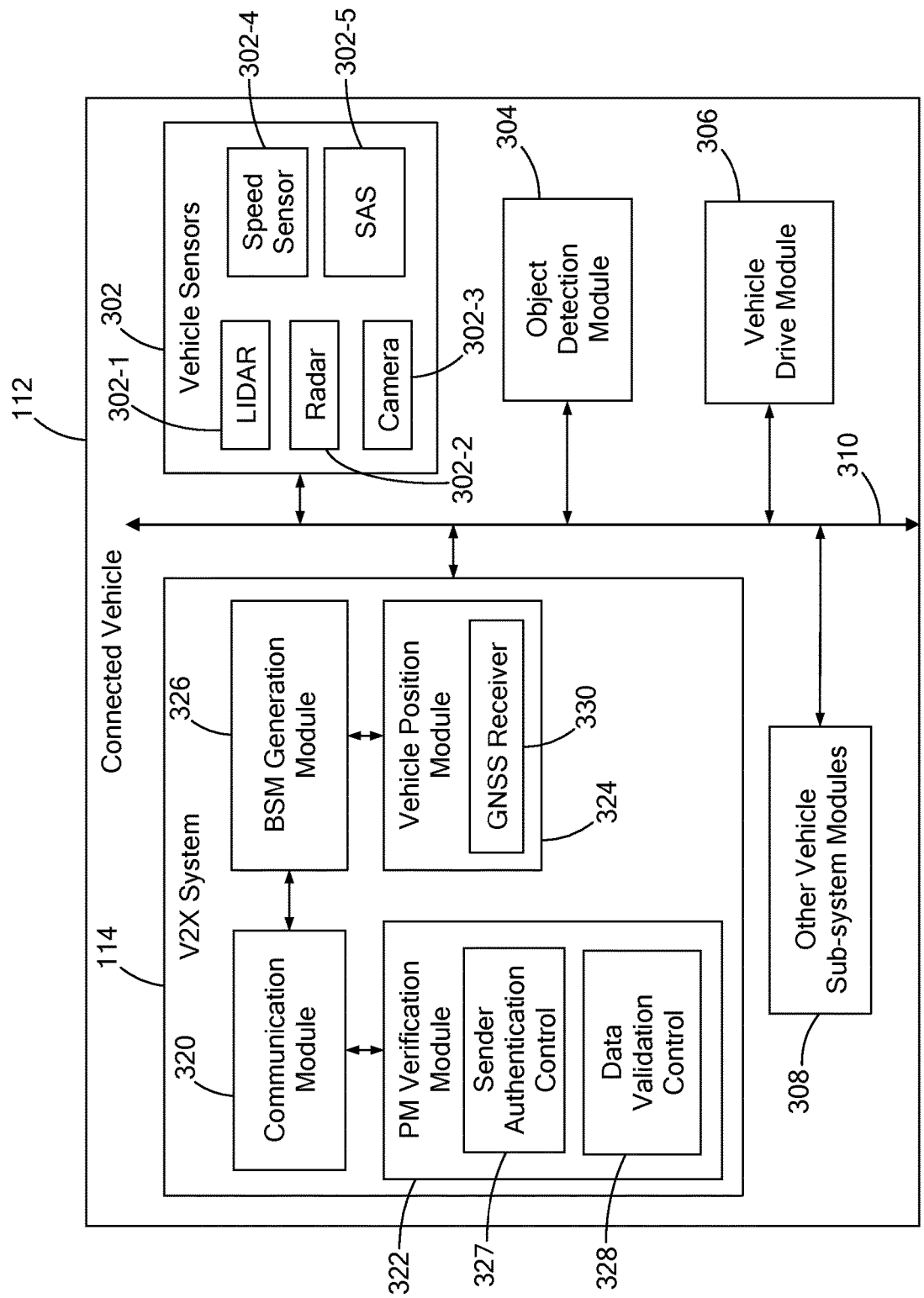
FIG. 3 is a block diagram of a vehicle having a V2X system in accordance with the teachings of the present disclosure.

More particularly, referring to FIG. 3, along with the V2X system 114, the CV 112 includes one or more vehicle sensors 302, an object detection module 304, and a vehicle drive module 306. It should be readily understood that the CV 112 includes other vehicle sub-system modules generally provided with reference number 308, such as but not limited to: human machine interface (HMI) module that includes audio-visual system disposed in the passenger cabin to communicate with passengers in the vehicle; a drive control subsystem to generate and deliver power to the wheels of the CV based on control signals from the vehicle drive module; and/or a brake system to slow the CV 112 based on a control command from the vehicle drive module 306. In one form, the various components/systems of the CV 112 communicate with each other via a vehicle communication network 310 such as a controller area network (CAN), a local interconnect network (LIN), a wireless network, among others.

The vehicle sensors 302 include various types of sensors including object detector sensors such as a LIDAR 302-1, a radar 302-2, and/or a camera 302-3 arranged about the CV 112 to detect objects around the vehicle. The vehicle sensors 302 may also include sensors within the CV 112 to detect vehicle operation parameters such as a speed sensor 302-4 for measuring a speed of the CV 112 and a steering angle sensor (SAS) 302-5 for measuring rotational angle of a steering wheel. While specific examples are provided, the vehicle sensors 302 may include other sensors such as a brake pedal sensor, an acceleration pedal sensor, among others, and should not be limited to the sensors described herein.

Based on the data from the object detector sensors, the object detection module 304 is configured to detect objects (i.e., moving and/or stationary) about the CV 112 and determine characteristics of the objects such as, but not limited to, the type of object detected, position, speed, distance, and/or trajectory. As an example, similar to the IOD module 204, the object detection module 304 is configured to analyze the signals transmitted and received by the object detection module 304 to determine whether an object is present, and if so, determines one or more dynamic characteristics if the object is moving, which can be determined using multiple sets of transmitted and received signals. In another example, based on images from the camera 302-3, the object detection module 304 is configured to use known object recognition software to detect an object in the image(s) such as, but not limited to: lane markings, headlights of an oncoming vehicle, and/or brake lights of a front vehicle, among others.

The vehicle drive module 306 is configured to control various vehicle sub-systems to drive the CV 112. In one form, the vehicle drive module 306 receives data from vehicle sensors 302 regarding an input from a driver such as, but not limited to: rotation of a steering wheel, actuation of the acceleration pedal, and/or actuation of a brake pedal. Based on these inputs and prestored control programs, the vehicle drive module 306 transmits control signals to, for example, the drive sub-system to generate power via the engine or battery to move the vehicle and/or to the brake sub-system to actuate the brakes to reduce the speed of the vehicle. It should be readily understood that other driver inputs may be available for controlling the vehicle and are within the scope of the present disclosure. Furthermore, in one form, the vehicle drive module 306 may include different software applications for performing partial to fully automated controls. For example, the vehicle drive module 306 may provide lane change assist to move the CV 112 from a first drive lane to a second drive lane and/or a collision avoidance feature for inhibiting collision and/or reducing collision impact with an object.

In addition to the various sensors and modules provided within the CV 112 for monitoring the environment external of the CV 112, the V2X system 114 provides additional details regarding the environment, which can improve safety and operation of the CV 112. In one form, the V2X system 114 includes a communication module 320, a PM verification module 322, a vehicle position module 324, and a BSM generation module 326. In addition to other components, the V2X system 114 includes a microprocessor and a memory for storing computer programs executable by the microprocessor to have the V2X system perform the operations described herein.

The communication module 320 is configured to generate and broadcast V2X signals and receive V2X signals from an external device. As an example, the communication module 320 transmits BSM messages for the CV 112 and receives safety message from connected devices. Accordingly, in order to perform the functionality described herein, the communication module 320 includes one or more electronic components for supporting wireless communication such as DSRC and/or cellular and thus, may include transceivers, radio circuits, amplifiers, and/or modulation circuits among other electronic components. In the following, the communication module 320 may be referenced as the vehicle communication module to distinguish from the infrastructure communication module.

The PM verification module 322 is configured to evaluate a PM from the IED 110 to determine if the PM is from an authorized sender and if the data provided in the PM is valid. Accordingly, in one form, the PM verification module 322 is configured to have a sender authentication control 327 and a data validation control 328. The sender authentication control 327 authenticates the sender of the PM received by the communication module 320 using one or more predefined cryptographic protocol such as SCMS POC.

Once the sender is authenticated, the data validation control 328 performs an analytical comparison to validate the data provided in the PM. Specifically, in one form, the data validation control 328 may determine that the PM is valid or invalid based on other received safety messages and/or content of the PM. For example, the PM is identified as valid if another received safety message includes similar data as that in the PM (i.e., duplicate messages); the PM is identified as invalid if data is missing from required fields of the PM such as position, timestamp, among others; the PM is invalid if certain data is out of range such as position of the moving object and/or location of the sender is not within a predefined distance from the CV 112; and/or the PM is considered invalid if the wrong type of data is provided such as providing deceleration data and not position data. In another form, the data validation control 328 is configured to compare the dynamic characteristics of the moving object with data detected by the vehicle sensors 302 and/or determined by the object detection module 304. For example, the data validation control 328 receives information regarding objects detected by the object detection module 304 and compares the information to the dynamic characteristics provided in the PM. If one or more dynamic characteristics match, the PM is considered valid; otherwise it is invalid. It should be readily understood that other methods for validating the content of the PM may be used.

In the event the data of the PM is valid, the data is used by other modules within the CV 112 to analyze the moving object and provide safety advisories such as forward collision warning, do not pass warning, and/or left turn assist, among others. For example, the vehicle drive module 306 utilizes the data from the object detection module 304 and the PM verification module 322 to determine the position of moving object in association with the CV 112 to determine if the CV 112 can change lanes, if a vehicle in front of the CV 112 is breaking, and/or if a pedestrian is about to cross the street. In one form, the vehicle drive module 306 may automatically control the vehicle based on the safety advisory and/or notify the passenger of the vehicle of the safety advisory via the HMI. For example, with regard to the notification to the passenger, such as a driver, a safety notification may include providing an adjusted speed for the CV 112, recommending a dynamic lane change, and/or identifying a moving object ahead of the vehicle, among others.

The vehicle position module 324 determines positional information for the CV 112 and includes a Global Navigation Satellite System (GNSS) receiver 330. The vehicle position module 324 is configured to calculate a position of the CV 112 (e.g., latitude, longitude, elevation, among others) based on a GNSS position fix provided with the signals received by the GNSS receiver 330.

The BSM generation module 326 is configured to generate a BSM for the CV 112 and broadcast the BSM via the communication module 320 in accordance with a predefined protocol. That is, as provided above, the BSM includes dynamic characteristics such as position, speed, and/or travel direction, among other characteristics related to the operation of the CV 112. The BSM generation module 326 acquires data indicative of the dynamic characteristics of the CV from the vehicle position module 324, the vehicle sensors 302, and/or the vehicle drive module 306, among other components/modules within the CV 112. In addition to dynamic characteristics, the BSM includes other data for authenticating the message such as vehicle identification and a timestamp when the message is broadcasted.

The CV 112 may include other modules for further evaluating safety messages. For example, in one form, the CV 112 may include an anomaly detection machine learning module that includes a database for storing PMs and is trained to detect variances in data received via the V2X system. The variances may indicate that the safety message may be counterfeit, manipulated, and/or tampered. For example, when BSMs from two vehicles provide overlapping positions for multiple transmissions, the BSMs may be flagged as invalid. Accordingly, using anomaly detection machine learning algorithm, the CV 112 is able identify unreliable information, thus, improving security and safety of the CV 112. The anomaly detection machine learning algorithm may also be provided with IED 110.

As described herein, the IED of the present disclosure generates proxy BSM and proxy PSM using data from the roadside sensors. Connected devices, such as the CV of the present disclosure, authenticate and validate the safety messages. Once validated, the data provided in the safety messages can be used to generate safety advisories and warnings which can be provided to passengers in the vehicle via the HMI and/or used to control partial to fully autonomous vehicles. That is, each CV is able to decide how to use the validated data even when one CV is a manual vehicle and another is an autonomous vehicle, or when different control programs are used for controlling different autonomous vehicles.

Figure 4:
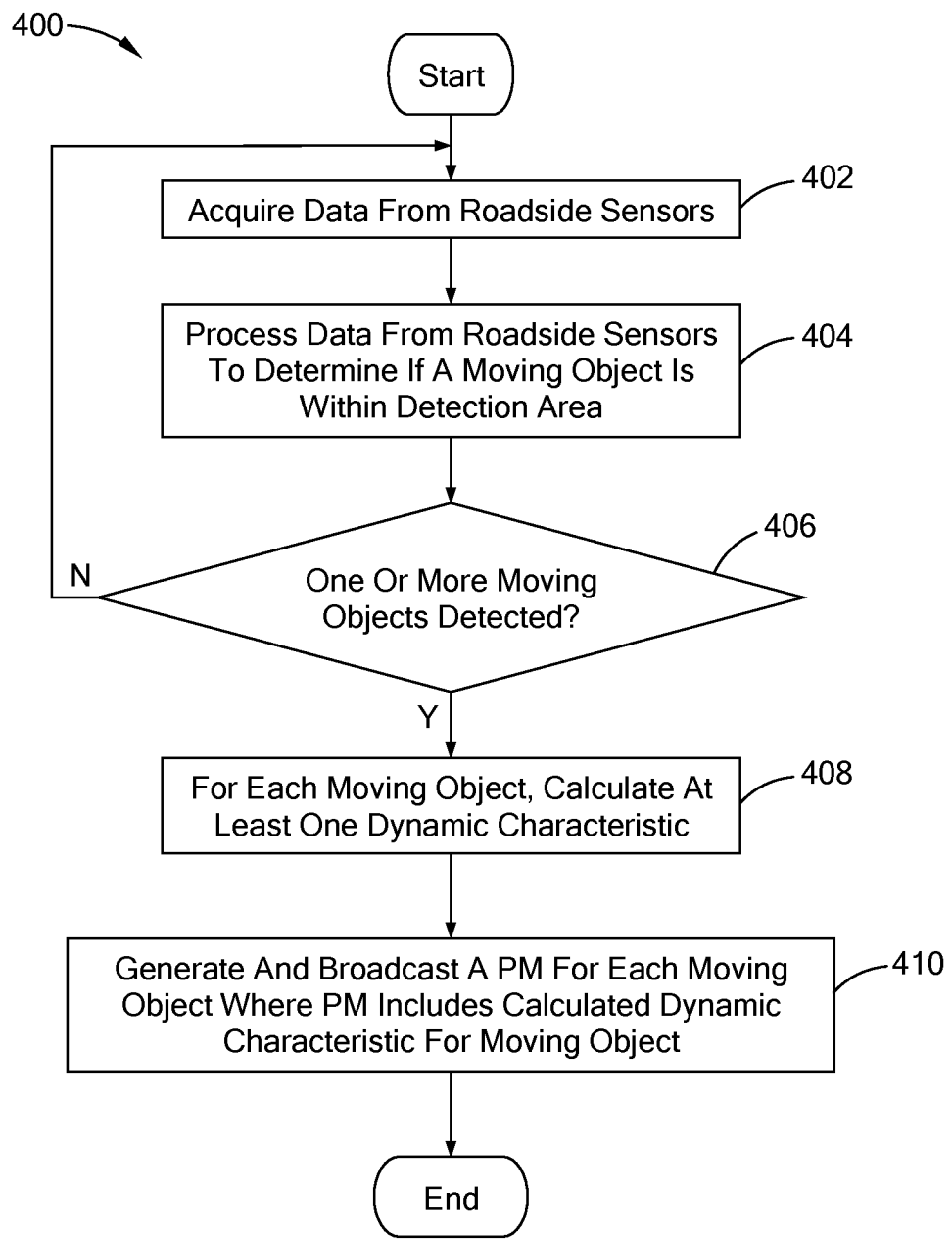
FIG. 4 is a flowchart of a proxy message generation routine in accordance with the teachings of the present disclosure.

Referring to FIG. 4, an example PM generation routine 400 is provided. In one form, the PM generation routine 400 is performed by the IED at a predefined frequency based on the rate at which a proxy safety message should be transmitted. At 402, the IED acquires data from roadside sensors and, at 404, processes the data from the roadside sensors to determine if a moving object is within the detection area. For example, using known signal analysis techniques and/or object recognition techniques, the IED may identify a moving object with the detection area defined by the roadside sensors. At 406, the IED determines if one or more moving objects is/are detected. If so, the IED calculates at least one dynamic characteristics for each moving object detected, at 408. Next, as detailed above, the IED generates and broadcasts a PM for each moving object where the PM includes the calculated dynamic characteristic for the moving object, at 410. It should be readily understood, that the IED may be configured in various suitable ways to generate and broadcast a PM, and should not be limited to the routine 400. For example, in one form, the IED may compare the dynamic characteristics of a moving object with data from safety messages transmitted by connected devices. If the dynamic characteristics match that of one provided in a safety message, the IED may not transmit the PM for that particular moving object.

Along with the PM generation routine, the IED may be configured to perform other functions as described herein. Such as processing safety messages received from connected vehicles to calibrate roadside sensors and/or algorithms used for detecting objects.

Figure 5:
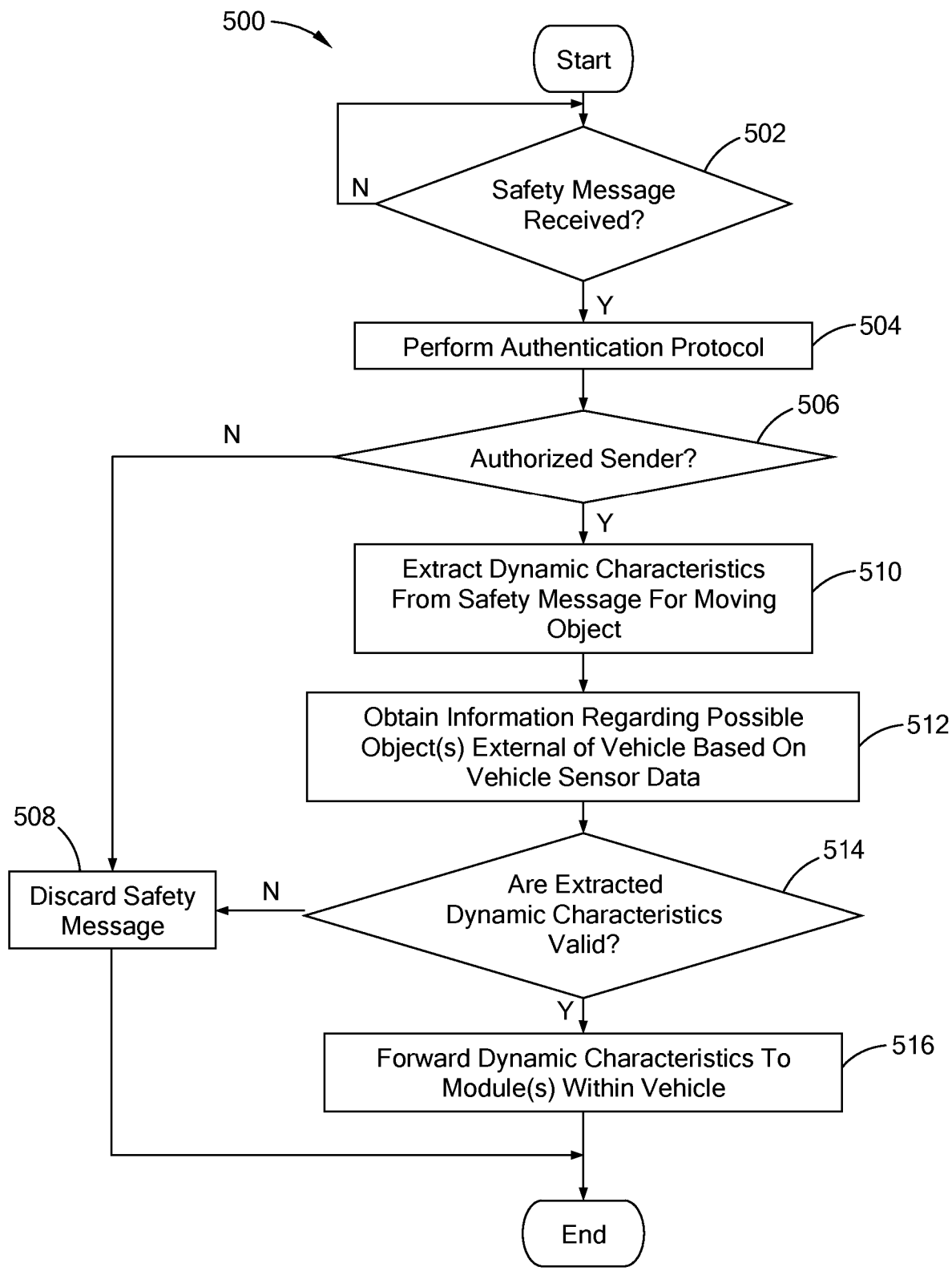
FIG. 5 is a flowchart of a proxy message evaluation routine in accordance with the teachings of the present disclosure.

Referring to FIG. 5, an example of a safety message evaluation routine 500 is provided. The safety message evaluation routine 500 is performed by the V2X system of the CV. At 502, the V2X system determines if a safety message, such the PM, is received. If so, the V2X system performs a predefined authentication protocol, at 504, and, at 506, determines if the sender of the safety message is an authorized sender. If not, the safety message is considered an unauthorized communication and the V2X system discards the safety message (e.g., deletes the safety message, stores the data, but does not use the safety message for vehicle control analysis), at 508.

If the sender is authorized, the V2X system extracts the dynamic characteristics of the moving object from the safety message, at 510 and obtains information regarding possible object(s) about the CV based on vehicle sensor data, at 512. The V2X system determines if the data from the safety message is valid, at 514. That is, using one or more of the methods described above, which can include comparing the dynamic characteristics of the moving object with data regarding detected objects above the vehicle, the V2X system may determine if the content of the safety message is valid. If the data is not valid, the V2X system discards the safety message at 508. If the data is valid, the V2X system forwards the data to one or more modules within the CV for a vehicle control analysis to assess possible safety advisories (i.e., a safety advisory action), at 516. It should be readily understood, that the V2X system may be configured in various suitable ways to process the safety message, and should not be limited to the routine 500. For example, in one form, the V2X system may determine that the dynamic characteristics of the moving object is valid based on the content of the safety message itself and not using data from vehicle sensors.

Based on the foregoing, the following provides a general overview of the present disclosure and is not a comprehensive summary. In one form, the present disclosure is directed toward a method for generating a message including dynamic characteristics of a moving object. The method includes acquiring data from a roadside sensor, identifying a moving object within a detection area based on the acquired data from the roadside sensor, calculating one or more dynamic characteristics of the moving object based on the acquired data from the roadside sensor, generating a proxy safety message for the identified moving object, and broadcasting the proxy safety message for the identified moving object. The proxy safety message includes data indicative of the calculated dynamic characteristics of the identified moving object.

In one variation, the dynamic characteristics of the identified moving object includes a position, a travel direction, a speed, or a combination thereof.

In another variation, the method further includes acquiring a basic safety message from a connected moving object, where the basic safety message includes data indicative of dynamic characteristics of the connected moving object; and determining if the connected moving object is the identified moving object. The proxy safety message for the identified moving object is transmitted when the connected moving object is not the identified moving object, and the proxy safety message for the identified moving object is not transmitted when the connected moving object is the identified moving object.

In yet another variation, the method further includes receiving a basic safety message from a vehicle, where the basic safety message includes data indicative of dynamic characteristics of the vehicle; determining if the vehicle is the identified moving object based on the dynamic characteristics of the vehicle and the dynamic characteristics of the vehicle; and calibrating data from the roadside sensor based on the basic safety message.

In one form, the present disclosure is directed towards a method for processing a proxy safety message from an infrastructure edge device in communication with a subject vehicle. The method includes receiving a proxy safety message regarding a moving object external of the subject vehicle. The proxy safety message includes data indicative of dynamic characteristics of the moving object. The method further includes determining whether the data of the proxy safety message is valid based on sensor data from one or more sensors disposed about the subject vehicle, content of the proxy safety message, or a combination thereof and discarding the proxy safety message in response to the proxy safety message being invalid.

In one variation, the method further includes performing a vehicle control analysis based on the data from the proxy safety message in response to the data being valid and determining whether a safety advisory action is to be performed based on the vehicle control analysis.

In another variation, the safety advisory action includes issuing a notification to a passenger of the subject vehicle.

In yet another variation, the notification includes providing an adjusted speed for the subject vehicle, recommending a dynamic lane change, identifying an object ahead of the subject vehicle, or a combination thereof.

In one variation, determining whether the data from the proxy safety message is valid further includes determining whether a required field of the proxy safety message is missing and providing the proxy safety message as invalid in response to the required field missing from the proxy message.

In another variation, determining whether the data from the proxy safety message is valid further includes detecting one or more objects external of a vehicle based on sensor data from one or more sensors disposed about the vehicle, determining whether the moving object identified in the proxy safety message is among the one or more objects detected, providing the proxy safety message as valid when the moving object is among the one or more objects detected, and providing the proxy safety message as invalid when the moving object is not among the one or more objects detected.

In yet another variation, the method further includes receiving a basic safety message from a connected vehicle. The basic safety message includes dynamic characteristics of the connected vehicle, and determining whether the data from the proxy safety message is valid further includes comparing the dynamic characteristics of the connected vehicle with that of the moving object, providing the proxy safety message as being valid in response to the dynamic characteristics of the connected vehicle being the same as that of the moving object, and providing the proxy safety message as being invalid in response to the dynamic characteristics of the connected vehicle being different from that of the moving object.

In one variation, the dynamic characteristics of the identified object includes a position, a travel direction, a speed, or a combination thereof.

In another variation, the method further includes identifying, by the infrastructure edge device, the moving object within a detection area based on data from a roadside sensor, calculating, by the infrastructure edge device, the dynamic characteristics of the moving object based on the data from the roadside sensor, generating, by the infrastructure edge device, the proxy safety message for the identified moving object, and transmitting, by the infrastructure edge device, the proxy safety message for the identified moving object using wireless communication. The proxy safety message includes data indicative of the dynamic characteristics of the identified moving object.

In yet another variation the method further includes acquiring, by the infrastructure edge device, a basic safety message from a connected moving object, where the basic safety message includes data indicative of dynamic characteristics of the connected moving object, determining if the connected moving object is the identified moving object based on the dynamic characteristics of the connected moving object and the dynamic characteristics of the identified moving object, and calibrating the roadside sensor based on the basic safety message.

In one form, the present disclosure is directed towards a system for a subject vehicle. The system includes a processor and a non-transitory computer-readable medium comprising instructions that are executable by the processor. The instructions includes: authenticating a sender of a proxy safety message, where the proxy safety message includes data indicative of dynamic characteristics of a moving object, determining whether the data of the proxy safety message is valid based on sensor data from one or more sensors disposed about the subject vehicle, content of the proxy safety message, or a combination thereof and discarding the proxy safety message in response to the proxy safety message being from an authorized sender or including invalid data.

In one variation, the instructions further include performing a vehicle control analysis based on the data from the proxy safety message in response to the data being valid and determining whether a safety advisory action is to be performed based on the vehicle control analysis.

In another variation, the instructions for determining whether the data from the proxy safety message is valid further comprises determining whether a required field of the proxy safety message is missing and providing the proxy safety message as invalid in response to the required field missing from the proxy message.

In yet another variation, the instructions for determining whether the data from the proxy safety message is valid further includes detecting one or more objects external of the subject vehicle based on sensor data from one or more sensors disposed about the vehicle, determining whether the moving object identified in the proxy safety message is among the one or more objects detected, providing the proxy safety message as valid when the moving object is among the one or more objects detected, and providing the proxy safety message as invalid when the moving object is not among the one or more objects detected.

In one variation, the instructions further include receiving a basic safety message from a connected vehicle. The basic safety message includes dynamic characteristics of the connected vehicle and determining whether the data from the proxy safety message is valid further includes comparing the dynamic characteristics of the connected vehicle with that of the moving object, providing the proxy safety message as being valid in response to the dynamic characteristics of the connected vehicle being the same as that of the moving object, and providing the proxy safety message as being invalid in response to the dynamic characteristics of the connected vehicle being different from that of the moving object.

In another variation, the dynamic characteristics of the identified object includes a position, a travel direction, a speed, or a combination thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for generating a message including dynamic characteristics of a moving object, the method comprising:
acquiring data from a roadside sensor;
identifying a moving object within a detection area based on the acquired data from the roadside sensor;

calculating one or more dynamic characteristics of the moving object based on the acquired data from the roadside sensor;
generating a proxy safety message for the identified moving object, wherein the proxy safety message includes data indicative of the calculated dynamic characteristics of the identified moving object;
broadcasting the proxy safety message for the identified moving object,
acquiring a basic safety message from a connected moving object, wherein the basic safety message includes data indicative of dynamic characteristics of the connected moving object; and
determining if the connected moving object is the identified moving object, wherein:
the proxy safety message for the identified moving object is transmitted when the connected moving object is not the identified moving object; and
the proxy safety message for the identified moving object is not transmitted when the connected moving object is the identified moving object.

2. The method of claim 1, wherein the dynamic characteristics of the identified moving object includes a position, a travel direction, a speed, or a combination thereof.

3. The method of claim 1 further comprising:
receiving a basic safety message from a vehicle, wherein the basic safety message includes data indicative of dynamic characteristics of the vehicle;
determining if the vehicle is the identified moving object based on the dynamic characteristics of the vehicle; and
calibrating data from the roadside sensor based on the basic safety message.

4. A method for processing a proxy safety message from an infrastructure edge device in communication with a subject vehicle, the method comprising:
receiving a proxy safety message regarding a moving object external of the subject vehicle, wherein the proxy safety message includes data indicative of dynamic characteristics of the moving object;
determining whether the data of the proxy safety message is valid based on sensor data from one or more sensors disposed about the subject vehicle, content of the proxy safety message, or a combination thereof, wherein determining whether the data from the proxy safety message is valid further comprises:
detecting one or more objects external of a vehicle based on sensor data from one or more sensors disposed about the vehicle;
determining whether the moving object identified in the proxy safety message is among the one or more objects detected;
providing the proxy safety message as valid when the moving object is among the one or more objects detected; and
providing the proxy safety message as invalid when the moving object is not among the one or more objects detected; and
discarding the proxy safety message in response to the proxy safety message being invalid.

5. The method of claim 4 further comprising performing a vehicle control analysis based on the data from the proxy safety message in response to the data being valid and determining whether a safety advisory action is to be performed based on the vehicle control analysis.

6. The method of claim 5, wherein the safety advisory action includes issuing a notification to a passenger of the subject vehicle.

7. The method of claim 6, wherein the notification includes providing an adjusted speed for the subject vehicle, recommending a dynamic lane change, identifying an object ahead of the subject vehicle, or a combination thereof.

8. The method of claim 4, wherein determining whether the data from the proxy safety message is valid further comprises determining whether a required field of the proxy safety message is missing and providing the proxy safety message as invalid in response to the required field missing from the proxy safety message.

9. The method of claim 4 further comprising:
receiving a basic safety message from a connected vehicle, wherein the basic safety message includes dynamic characteristics of the connected vehicle,
wherein determining whether the data from the proxy safety message is valid further comprises:
comparing the dynamic characteristics of the connected vehicle with that of the moving object;
providing the proxy safety message as being valid in response to the dynamic characteristics of the connected vehicle being the same as that of the moving object; and
providing the proxy safety message as being invalid in response to the dynamic characteristics of the connected vehicle being different from that of the moving object.

10. The method of claim 4, wherein the dynamic characteristics of the moving object includes a position, a travel direction, a speed, or a combination thereof.

11. The method of claim 4 further comprising:
identifying, by the infrastructure edge device, the moving object within a detection area based on data from a roadside sensor;
calculating, by the infrastructure edge device, the dynamic characteristics of the moving object based on the data from the roadside sensor;
generating, by the infrastructure edge device, the proxy safety message for the identified moving object, wherein the proxy safety message includes data indicative of the dynamic characteristics of the identified moving object; and
transmitting, by the infrastructure edge device, the proxy safety message for the identified moving object using wireless communication.

12. The method of claim 11 further comprising:
acquiring, by the infrastructure edge device, a basic safety message from a connected moving object, wherein the basic safety message includes data indicative of dynamic characteristics of the connected moving object;
determining if the connected moving object is the identified moving object based on the dynamic characteristics of the connected moving object and the dynamic characteristics of the identified moving object; and
calibrating the roadside sensor based on the basic safety message.

13. A system for a subject vehicle comprising:
a processor; and
a non-transitory computer-readable medium comprising instructions that are executable by the processor, wherein the instructions comprise:
authenticating a sender of a proxy safety message, wherein the proxy safety message includes data indicative of dynamic characteristics of a moving object;
determining whether the data of the proxy safety message is valid based on sensor data from one or more sensors disposed about the subject vehicle, content of the proxy safety message, or a combination thereof, wherein determining whether the data from the proxy safety message is valid further comprises:

comparing dynamic characteristics of a connected vehicle with that of the moving object, wherein the dynamic characteristics are provided in a basic safety message received from the connected vehicle;

providing the proxy safety message as being valid in response to the dynamic characteristics of the connected vehicle being the same as that of the moving object, and providing the proxy safety message as being invalid in response to the dynamic characteristics of the connected vehicle being different from that of the moving object; and discarding the proxy safety message in response to the proxy safety message being from an authorized sender or including invalid data.

14. The system of claim 13, wherein the instructions further comprise performing a vehicle control analysis based on the data from the proxy safety message in response to the data being valid and determining whether a safety advisory action is to be performed based on the vehicle control analysis.

15. The system of claim 13, wherein the instructions for determining whether the data from the proxy safety message is valid further comprises determining whether a required field of the proxy safety message is missing and providing the proxy safety message as invalid in response to the required field missing from the proxy safety message.

16. The system of claim 13, wherein the instructions for determining whether the data from the proxy safety message is valid further comprises:

detecting one or more objects external of the subject vehicle based on sensor data from one or more sensors disposed about the vehicle;

determining whether the moving object identified in the proxy safety message is among the one or more objects detected;

providing the proxy safety message as valid when the moving object is among the one or more objects detected; and providing the proxy safety message as invalid when the moving object is not among the one or more objects detected.

17. The system of claim 13, wherein the dynamic characteristics of the moving object includes a position, a travel direction, a speed, or a combination thereof.

* * * * *